(12) United States Patent
Hiraguchi

(10) Patent No.: US 6,988,686 B2
(45) Date of Patent: *Jan. 24, 2006

(54) RECORDING TAPE CARTRIDGE

(75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 241 days.

This patent is subject to a terminal disclaimer.

(21) Appl. No.: 10/298,216

(22) Filed: Nov. 18, 2002

(65) Prior Publication Data

US 2003/0094525 A1 May 22, 2003

(30) Foreign Application Priority Data

Nov. 20, 2001 (JP) ........................ 2001-354876

(51) Int. Cl.
G11B 23/107 (2006.01)

(52) U.S. Cl. .................. 242/338; 242/348.2; 360/132
(58) Field of Classification Search ............... 242/338, 242/338.1, 338.2, 338.4, 348, 348.2; 360/132, 360/95

See application file for complete search history.

(56) References Cited

U.S. PATENT DOCUMENTS

| | | | |
|---|---|---|---|
| 4,045,821 A | 8/1977 | Fujikura | |
| 4,383,660 A | 5/1983 | Richard et al. | |
| 4,426,047 A | 1/1984 | Richard et al. | |
| 5,332,173 A | 7/1994 | Kubota et al. | |
| 5,570,252 A | 10/1996 | Sumner et al. | |
| 5,868,333 A | 2/1999 | Nayak | |
| 6,034,839 A | 3/2000 | Hamming | |
| 6,349,892 B2 | 2/2002 | Morita et al. | |
| 6,581,865 B1 | 6/2003 | Zweighaft et al. | |
| 6,742,738 B2 * | 6/2004 | Hiraguchi | 242/338 |
| 2003/0071157 A1 | 4/2003 | Hiraguchi et al. | |
| 2003/0071158 A1 | 4/2003 | Hiraguchi et al. | |
| 2003/0071159 A1 | 4/2003 | Hiraguchi et al. | |
| 2003/0080228 A1 | 5/2003 | Hiraguchi et al. | |
| 2003/0094527 A1 | 5/2003 | Hiraguchi | |
| 2003/0094528 A1 | 5/2003 | Hiraguchi | |
| 2003/0094530 A1 | 5/2003 | Hiraguchi | |
| 2003/0094531 A1 | 5/2003 | Hiraguchi | |
| 2003/0094532 A1 | 5/2003 | Hiraguchi | |
| 2003/0106953 A1 | 6/2003 | Hiraguchi et al. | |
| 2003/0178519 A1 | 9/2003 | Hancock et al. | |

FOREIGN PATENT DOCUMENTS

| | | |
|---|---|---|
| JP | 61-61470 | 3/1986 |
| JP | 9-39832 | 2/1997 |
| JP | 63-53633 | 10/1998 |
| JP | 11-213615 | 8/1999 |
| JP | 11-242871 | 9/1999 |
| JP | 11-297032 | 10/1999 |
| JP | 2000-243056 A | 9/2000 |
| JP | 2000-331403 | 11/2000 |
| JP | 2001-273740 | 10/2001 |

* cited by examiner

Primary Examiner—Eileen D. Lillis
Assistant Examiner—Evan Langdon
(74) Attorney, Agent, or Firm—Sughrue Mion, PLLC

(57) ABSTRACT

A recording tape cartridge for enabling size reduction of a drive device. A substantially rectangular case rotatably accommodates a single reel on which a recording tape is wound. An opening, for drawing out a leader member attached to an end portion of the tape, is formed by cutting away a corner portion of the case at a side of loading into a drive device. A covering member, which is formed to be substantially circular arc-shaped in plan view, moves on a predetermined circular circumference at a side wall portion which is parallel with a drive device loading direction, to open and close the opening. An operation portion protrudes from the covering member and is operated by an opening member provided at the drive device. The operation member moves at one side of the position of a movement path of the covering member that is closest to the side wall in plan view, the one side being bounded by this position.

20 Claims, 12 Drawing Sheets

RECORDING TAPE CARTRIDGE

BACKGROUND OF THE INVENTION

1. Field of the Invention

The present invention relates to a recording tape cartridge which rotatably accommodates in a case a single reel onto which a recording tape such as a magnetic tape or the like is wound, and is principally utilized as a recording/replaying medium for computers and the like.

2. Description of the Related Art

Magnetic tape cartridges which accommodate in a case a single reel onto which a magnetic tape is wound, and which are principally utilized as a recording/replaying medium for computers and the like, have been known in the prior art. A leader member, which is to say a leader pin, a leader tape, a leader block or the like, is provided at a distal end of such a magnetic tape. The leader member is drawn out through an opening aperture of the magnetic tape cartridge by drawing-out means provided at a drive device side. Thence, the magnetic tape to which the leader member is fixed is wound around a drive device side winding reel.

A reel gear is formed in an annular shape at the middle of a lower face of the reel, and is exposed through an opening hole formed in a lower face of the magnetic tape cartridge. A driving gear provided at a drive device side rotation shaft meshes with the reel gear. Thus, in this structure, the reel is driven to rotate. Consequently, the reel of the magnetic tape cartridge and the winding reel of the drive device are rotated contemporaneously. Hence, data can be recorded to the magnetic tape, and data recorded at the magnetic tape can be replayed.

Such magnetic tape cartridges can be kept in a small accommodation space at a time of storage, and can record large volumes of information. As shown in FIGS. 10 to 12, the position of the opening aperture, and the type of a door that opens and closes the opening aperture is different for each of the different types of leader member. Specifically, in the case of a leader pin 110, as shown in FIG. 10, an opening 118 is formed in a side wall 114 of a case 112. The side wall 114 is parallel with a loading direction into a drive device (the direction of an arrow P). The opening 118 is opened and closed by a door 116, which slides to move in the same direction as the loading direction.

However, if the opening 118 is provided in the side wall 114 of the case 112 in this manner, the drive device side drawing-out means must turn the leader pin 110 around from a left-right transverse direction of the case 112 to draw out the leader pin 110. Therefore, a space for the drawing-out means to turn around must be reserved at the drive device side, and a mechanism for turning around of the drawing-out means is complicated. Thus, the drive device will become larger, which is disadvantageous. Moreover, there is a further problem in that a drawing-out path of a magnetic tape 111 becomes longer.

Alternatively, in the case of a leader tape 120, as shown in FIG. 11, an opening 128 is formed in a front wall 124 of a case 122. The front wall 124 intersects the direction of loading into the drive device (the direction of arrow P). A door 126 opens and closes the opening 128. The door 126 is a rotating-type door which rotates forward about a support shaft 125 which supports the door 126 at a corner portion vicinity of the case 122. However, when the opening 128 is provided in the front wall 124 of the case 122 in this manner, although there is no need for drive device side drawing-out means to turn around, the door opens forward by a large amount. Therefore, it is necessary to reserve space at the drive device side, such that no part of the drive device impedes the door 126 when the opening 128 is opened. Thus, the drive device becomes larger, and this is disadvantageous.

Furthermore, in the case of a leader block 130, as shown in FIG. 12, an opening 138 is formed by diagonally cutting away a corner portion 134 at a front side in the direction of loading into the drive device. The opening 138 is directly opened and closed by the leader block 130. However, when the leader block 130 opens and closes the opening 138 in this manner, there is a problem in that the leader block 130 will tend to become damaged or soiled. That is, the leader block 130 fits into a drive device side reel hub 136, and structures a portion of the reel hub 136. Therefore, damage and soiling that would not be a problem for usual use as a door make it difficult to fit the leader block 130 with the reel hub 136, and there is a risk that running of the magnetic tape 111 may be disadvantaged.

Moreover, the leader block 130 is anchored only at peripheral portions of the opening 138. Therefore, it is easy for the leader block 130 to come out if the magnetic tape cartridge is dropped, which is disadvantageous. In addition, the size of the leader block 130 is large in comparison to the leader pin 110. Therefore, there is a problem in that constraints on the form of the case are numerous. Thus, the leader pin 110, from which the function of the door is separated, is superior to the leader block 130, which is combinedly used as the door.

SUMMARY OF THE INVENTION

An object of the present invention is to provide a recording tape cartridge which is provided with an opening aperture which minimizes length of a drawing out path of a recording tape and a door which can open and close the aperture opening in little space, in which tape cartridge the door which closes the aperture and a leader member for drawing out the recording tape are provided as separate members, and which can provide for a reduction in size of a drive device.

In order to achieve the object described above, according to a first aspect of the present invention, a tape cartridge which is insertable at a tape drive, the tape drive being provided with an opening member which is operably engageable with the tape cartridge at a time of insertion of the tape cartridge and carrying out at least one of reading and writing of data, includes: a case which includes a front wall portion facing in a direction of insertion of the cartridge, a side wall portion substantially parallel to the cartridge insertion direction, and an angled wall portion connecting the front wall portion and the side wall portion, and angled relative to the cartridge insertion direction; a tape access opening provided at the angled wall portion of the case; a covering member which is reciprocally moveable along a circular arc-form movement path between a closed position for closing the tape access opening and an open position for opening the tape access opening; and an operation portion provided at the covering member, the operation portion being capable of moving the covering member in an open position direction when engaged with the opening member of the tape drive by an operation of insertion of the tape cartridge, wherein a position in the cartridge insertion direction of a point at which the circular arc-form movement path is closest to the side wall portion of the case is outside a range, in the cartridge insertion direction, of movement of a point of engagement of the opening member of the tape drive with the operation portion.

According to another aspect of the present invention, in a tape drive for carrying out at least one of reading and writing of data at a tape cartridge that includes: a case which includes a front wall portion facing in a direction of insertion of the cartridge, a side wall portion substantially parallel to the cartridge insertion direction, and an angled wall portion connecting the front wall portion and the side wall portion and angled relative to the cartridge insertion direction; a tape access opening provided at the angled wall portion of the case; a covering member which is reciprocally moveable along a circular arc-form movement path between a closed position for closing the tape access opening and an open position for opening the tape access opening; and an operation portion provided at the covering member, the operation portion being capable of moving the covering member in an open position direction when engaged with the tape drive by an operation of insertion of the tape cartridge, a position in the cartridge insertion direction of a point at which the circular arc-form movement path is closest to the side wall portion of the case being outside a range, in the cartridge insertion direction, of movement of a point of engagement of the opening member of the tape drive with the operation portion, the tape drive includes an opening member which is capable of engaging with the operating portion of the covering member and moving the covering member in the open position direction at the time of insertion of the tape cartridge.

DESCRIPTION OF THE PREFERRED EMBODIMENTS

A recording tape cartridge 10 according to an embodiment of the present invention will be explained based on FIGS. 1 through 6. Firstly, general overall structure of the recording tape cartridge 10 will be explained. Then, principal elements of the present invention, an opening 20 and a door 50 which serves as a covering member for opening and closing the opening 20, will be explained. For the sake of convenience of explanation, a loading direction of the recording tape cartridge 10 into a drive device, which is shown as arrow A, is referred to as a forward direction (front side) of the recording tape cartridge 10, and the direction of an arrow B intersecting arrow A is a rightward direction.

[Overall Structure of Recording Tape Cartridge]

Figure 1:
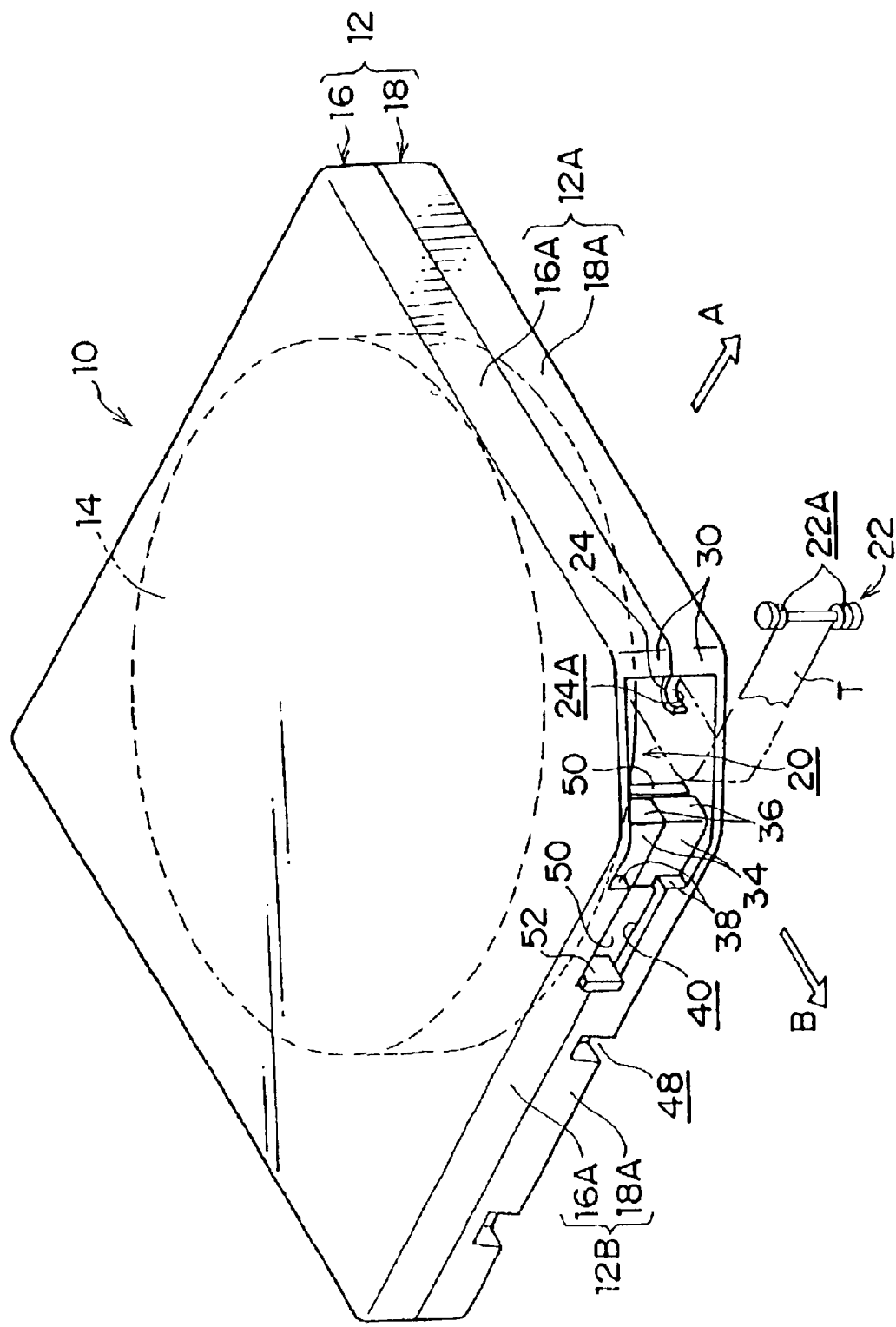
FIG. 1 is a schematic perspective view of a recording tape cartridge.
Figure 2:
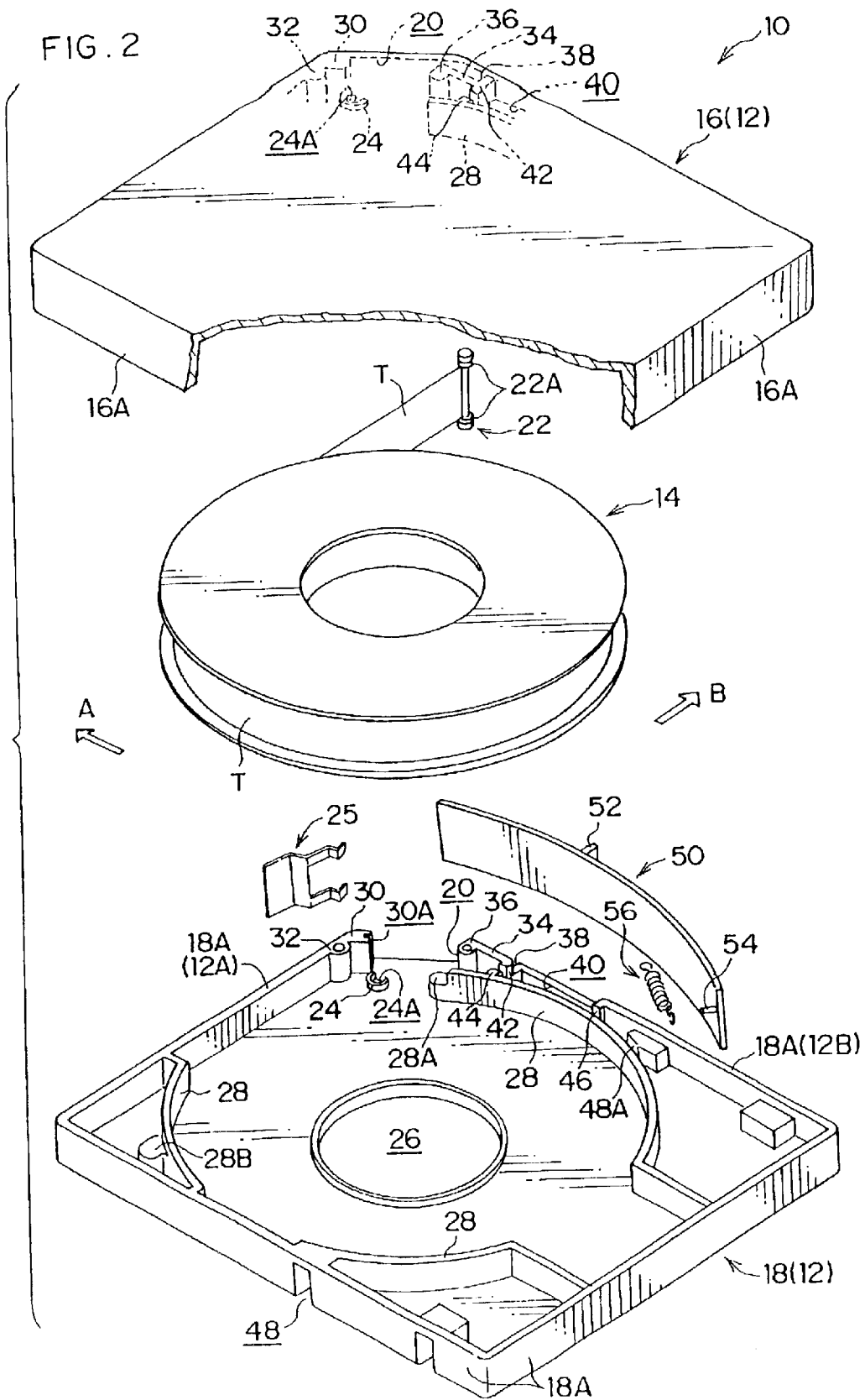
FIG. 2 is a schematic exploded perspective view of the recording tape cartridge.

FIG. 1 shows a perspective view of overall structure of the recording tape cartridge 10. FIG. 2 shows a schematic exploded perspective view of the recording tape cartridge 10. As shown in these drawings, the recording tape cartridge 10 is structured to rotatably accommodate a single reel 14 in a case 12. The case 12 is substantially rectangular in plan view. A magnetic tape T is wound onto the reel 14. The magnetic tape T serves as a recording tape which is an information recording/replaying (reading/writing) medium.

The case 12 is structured by matching up and joining two peripheral walls 16A and 18A of an upper case 16 and a lower case 18 to one another. A front-right corner portion of each of the upper case 16 and the lower case 18, which is a single corner portion at a front end side in the direction of loading into the drive device, is cut away. An accommodation space for the reel 14, onto which the magnetic tape T is wound, is provided inside the case 12. Hence, the cut away corner portions of the peripheral walls 16A and 18A of the upper case 16 and the lower case 18 serve as the opening 20 for drawing out the magnetic tape T.

A leader pin 22 is connected at a free end of the magnetic tape T that is drawn out through the opening 20. The leader pin 22 is caught up (engaged) by drawing-out means of the drive device, and subjected to a drawing-out operation. At each of two end portions of the leader pin 22, which protrude beyond width direction end portions of the magnetic tape T, an annular groove 22A is formed. These annular grooves 22A are caught on to by hooks or the like of the drawing-out means. Consequently, in this structure, the hooks or the like do not contact and damage the magnetic tape T when the magnetic tape T is drawn out.

At an inner side of the opening 20 of the case 12, a pair of upper and lower pin stands 24 are provided for positioning and retaining the leader pin 22 in the case 12. The pin stands 24 have semi-tubular forms, and both the end portions of the leader pin 22 are held at recess portions 24A of the pin stands 24 in a state in which the leader pin 22 is standing thereat. Outer peripheral walls of the pin stands 24 are open at a magnetic tape T drawing-out side thereof, to form exit/entry apertures through which the leader pin 22 is removed and inserted.

A leaf spring 25 is fixedly disposed in a vicinity of the pin stands 24. The leaf spring 25 engages with upper and lower end portions of the leader pin 22, and holds the leader pin 22 at the pin stands 24. The leaf spring 25 is structured to resiliently deform appropriately when the leader pin 22 is removed or inserted at the pin stands 24, and to allow movements of the leader pin 22.

A gear aperture 26 is formed at a central portion of the lower case 18. The gear aperture 26 is for exposing an unillustrated reel gear of the reel 14 to the outside. The reel gear meshes with a driving gear of the drive device, and the reel 14 is driven to rotate inside the case 12. Further, the reel 14 is held by free play-restricting walls 28 so as not to rattle about. The free play-restricting walls 28 are provided projecting at interior surfaces of the upper case 16 and the lower case 18, to serve as interior walls partially disposed along a circular path which is coaxial with the gear aperture 26.

A hollow portion 28A is provided continuously with an end portion of the free play-restricting walls 28 in a vicinity of the opening 20. A hole for regulation of position at an interior is formed in the hollow portion 28A. In addition, a hollow portion 28B is formed continuously with the free play-restricting walls 28 at an inner side of a front-left corner portion of the case 12. Another hole for regulation of position, which is a long hole, is formed in the hollow portion 28B. The hollow portion 28A and the hollow portion 28B are disposed co-linearly along the direction of arrow B. Except for the end portion at which the hollow portion 28A is continuously provided, each of the free play-restricting walls 28 is provided continuously with the peripheral wall 16A or the peripheral wall 18A of the case 12. Thus, outer sides of the free play-restricting walls 28 and the space for disposing the reel 14 are set apart.

[Structure of Opening and of Case at Opening Vicinity]

As described above, the opening 20 is formed by cutting away the front-right corner portion. Therefore, an opening face thereof (an angled wall portion) faces in the direction of arrow A and in the direction of arrow B. Consequently, the drawing-out means of the drive device can access and chuck the leader pin 22 from the direction of arrow A, from the direction of arrow B, or from a direction between the directions of arrow A and arrow B. As a result, an area in which the pin stands 24 that hold the leader pin 22 can be disposed is large, and a range from which the drawing-out means of the drive device can chuck the leader pin 22 is wide. Accordingly, a disposition position of the pin stands 24 can be specified to meet specifications of drive devices that carry out chucking from direction A and drive devices that carry out chucking from direction B. Thus, a degree of freedom of design of the drive device is broadened.

Figure 3:
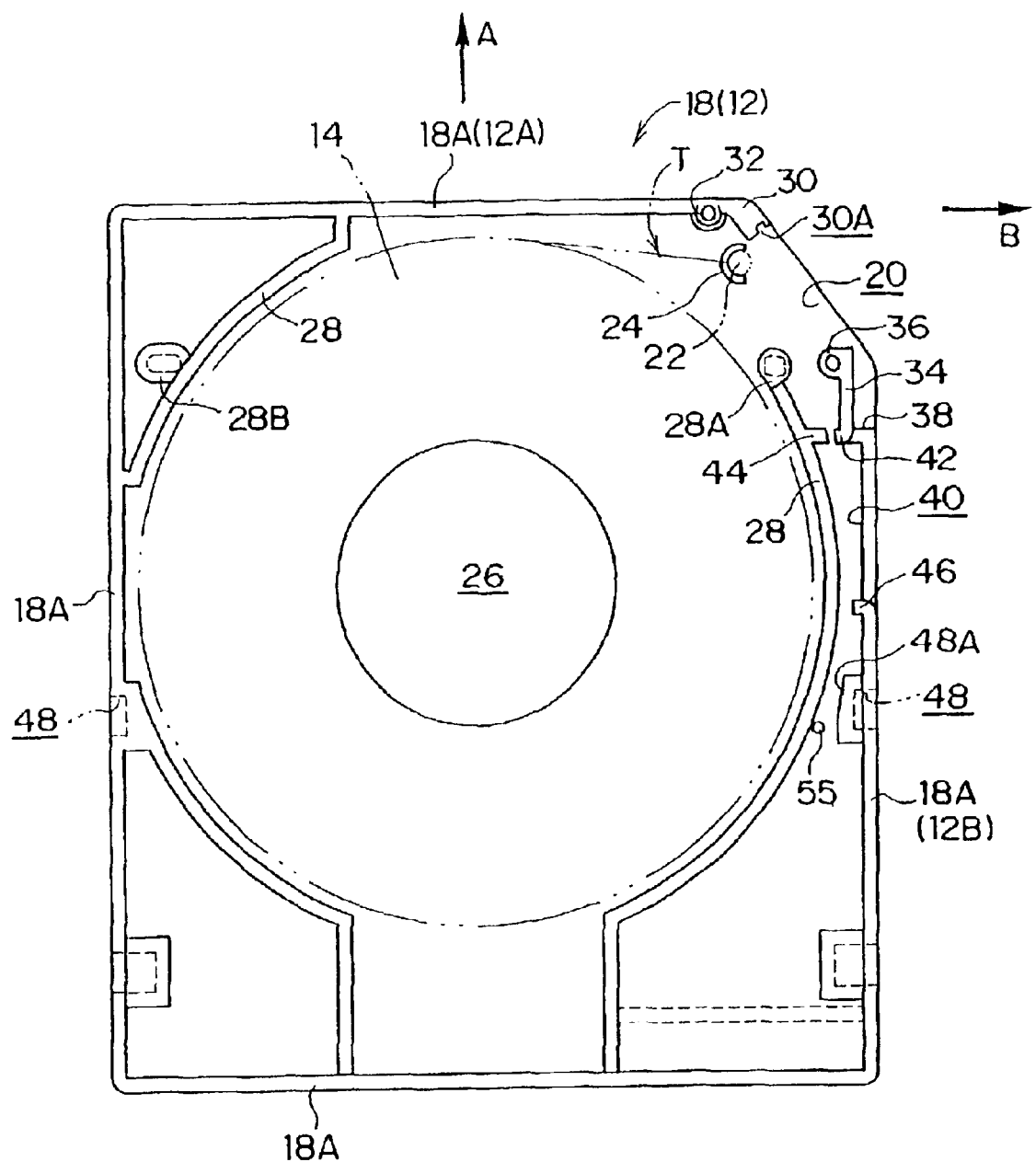
FIG. 3 is a schematic plan view of a lower case.

As is also shown in FIG. 3, which is a plan view of the lower case 18, a pair of short upper and lower diagonal wall portions 30 is provided at a right corner portion of a front wall 12A of the case 12 (a portion of the peripheral walls 16A and 18A whose outer surface faces in the direction of arrow A). The diagonal wall portions 30 define a front edge portion of the opening 20. The diagonal wall portions 30 curve to run along the opening face of the opening 20, and a wall thickness of the diagonal wall portions 30 is thicker than the front wall 12A. A recess portion 30A is formed at a thickness direction central portion of the diagonal wall portions 30. A distal end of the door 50, which is described later, enters into the recess portion 30A. Further, a pair of upper and lower screw bosses 32 are provided continuously with an inner side of the front wall 12A in a vicinity of a left end of the diagonal wall portions 30.

A pair of upper and lower offset wall portions 34 is provided at a front end portion of a right wall 12B of the case 12 (a right side wall of the peripheral walls 16A and 18A along the direction of arrow A). The offset wall portions 34 are slightly offset to the inside of the case 12 (leftward). Front ends of the offset wall portions 34 define a rear edge of the opening 20. A pair of upper and lower screw bosses 36 is provided continuously with an inner side of front end portions of the offset wall portions 34. Outer peripheral portions of the screw bosses 36 function as a guide for the door 50 which is slidable against the door 50 (to prevent rattling). Further, a pair of upper and lower step portions 38 is integrally formed between rear end portions of the offset wall portions 34 and the right wall 12B.

A slit 40 having a predetermined length, which serves as a window portion communicating between the interior and exterior of the case 12, is formed in the right wall 12B rearward of the offset wall portions 34. The slit 40 is for exposing an operation projection 52 of the below-described door 50. The slit 40 is formed by cutting away a lower portion of the peripheral wall 16A and an upper portion of the peripheral wall 18A, which structure the right wall 12B. By also cutting away a lower portion and an upper portion, respectively, of the upper and lower step portions 38, the slit 40 is opened frontward.

The slit 40 may instead be defined from above and below simply by a ceiling plate and a floor plate of the case 12. However, in view of strength when dropped, it is preferable if portions of the peripheral walls 16A and 18A are left above and below the slit 40 as described above, to function as ribs such that rigidity of the case 12 is maintained. In particular, the peripheral walls 16A and 18A, which join the upper and lower walls that define the slit 40 to one another at both ends thereof, are formed integrally (continuously) with the offset wall portions 34 (the step portions 38), which is even more preferable.

The protrusion portion 42 protrudes from rear end portions of the upper and lower offset wall portions 34, at a side thereof which is opposite to a side thereof at which the step portions 38 are disposed (that is, inward of the case 12) and is provided to span the whole height of the offset wall portions 34. A distal surface of the protrusion portion 42 is curved to correspond to an outer surface of the later-described door 50. In addition, a protrusion portion 44 spanning the whole height is provided at a location of the free play-restricting walls 28 which corresponds to the protrusion portion 42. The protrusion portion 44 is curved to correspond with an inner face of the door 50, and opposes the protrusion portion 42.

When the door 50 opens or closes the opening 20, the protrusion portion 42 and the protrusion portion 44 are slidable against the door 50 while sandwiching the door 50. Thus, the protrusion portion 42 and the protrusion portion 44 are for preventing the ingression of dust into the case 12, and are for guiding the door 50 (preventing looseness). A further protrusion portion 46 protrudes inward of the case 12 at a portion of the right wall 12B (the peripheral walls 16A and 18A) that defines a rear end of the slit 40. The protrusion portion 46 is also for preventing the ingression of dust into the case 12 and guiding the door 50 (preventing rattling).

A recess portion 48 is formed rearward of the protrusion portion 46 of the lower case 18. The recess portion 48 is recessed toward the inside of the case 12 at a portion of the peripheral wall 18A, which does not include an upper end of the peripheral wall 18A, and upward from a lower face of the case 12, and substantially has a three-sided box shape in sectional view. The recess portion 48 is also formed in a left wall of the case 12. These recess portions 48 serve as, for example, engaging portions for engaging with the drawing-out means of the drive device, with bottom surfaces of the recess portions 48 (surfaces that face downward) serving as reference surfaces for positioning in the drive device. Furthermore, twisting strength of the case 12 is improved by provision of the recess portions 48. A portion of the right wall 12B (the peripheral wall 18A) that defines the recess portion 48 is curved to correspond to the outer surface of the door 50. This guide surface 48A serves as a guide for the door 50, and is slideable against the outer surface of the door 50 when the opening 20 is opening or closing (to prevent looseness).

The upper case 16 and the lower case 18 described above are fixed (joined) by unillustrated screws which are screwed from the lower side into each of the screw bosses 32 and 36

(joining portions), which are located in the vicinities of edge portions of the opening 20. Accordingly, corner portions at both ends of the opening 20, which are defined by free ends of the diagonal wall portions 30 (the front wall 12A) and the offset wall portions 34 (the right wall 12B) and which tend to be severely affected when impacted against a floor or the like by a fall, are securely fixed. Thus, even if the case 12 is dropped, this structure will not be deformed or buckled by the overall weight of the recording tape cartridge 10, so as to cause mispositioning.

A major diameter across the threads of the screws may be, for example, 2.0 mm. Thus, an external diameter of the screw bosses 32 and the screw bosses 36 may be 4.0 mm. In place of this fixing with screws, projections may project from the upper case 16 at positions corresponding to the screw bosses 32 and 36, while fitting holes which fit with these projections are formed in the lower case 18, and the projections and fitting holes may be fitted with one another. However, in such a case, it is desirable that the upper case 16 and the lower case 18 be fixed with screws at locations within radii of 30 mm of these fitting locations. Further, matching surfaces of the peripheral wall 16A and the peripheral wall 18A (at both side corner portions of the opening 20) may be fixed by welding. However, fixing with screws is more preferable in consideration of dismantling and recycling.

Plate thicknesses of both the upper case 16 and the lower case 18 are set to 2 mm at the area in which the pin stands 24 are disposed (the vicinity of the opening 20), which is thicker than thicknesses at other areas thereof. The case 12 (the upper case 16 and the lower case 18) is formed of a polycarbonate (PC) material. The case 12 may be formed of acrilonitrile butadiene styrene (ABS) or a metal instead of PC. The purpose of this is to raise the strength of the vicinity of the pin stands 24, which is the location at which the leader pin 22 is held (positioned). Therefore, mispositioning of the leader pin 22, which is the most important component for functioning of the recording tape cartridge 10 (and which must be accurately engaged by the drawing-out means when the recording tape is to be drawn out), subsequent to impacts due to dropping of the case 12 (the recording tape cartridge 10) or the like does not occur.

Positions at which the pin stands 24 are disposed may be determined such that an axial center of the leader pin 22 held thereat is positioned on a first imaginary line which joins the front and rear edge portions of the opening 20, or further inside the case 12 than the first imaginary line. More preferably, the positions at which the pin stands 24 are disposed may be determined such that the axial center of the leader pin 22 is positioned on a second imaginary line which joins axial centers of the screw bosses 32 and the screw bosses 36, or further inside the case 12 than the second imaginary line. In the present embodiment, the pin stands 24 are positioned at a position closer to the screw bosses 32 than to the screw bosses 36. Consequently, with this structure, mispositioning of the leader pin 22 due to vibrations of the ceiling plate and the floor plate that accompany dropping of the case 12 or the like are prevented. In this case 12, the peripheral wall 16A of the upper case 16 and the peripheral wall 18A of the lower case 18 are set to equal heights. Thus, machining accuracies of portions thereof that match up with one another (accuracies of resin-forming in molds) are at about the same level. Thus, assembly characteristics and dropping impact resistance are made favorable.

A diagonal angle of the opening face of the opening 20 with respect to the direction of arrow A (a diagonal angle of the ceiling plate and floor plate of the case 12 that define the top and bottom of the opening 20) is determined in accordance with requirements for distinguishing (identifying) the recording tape cartridge 10 at a library apparatus. That is, the library apparatus accommodates a plurality of the recording tape cartridge 10 and automatically (i.e., without human intermediation) mounts and removes the recording tape cartridge 10 at the drive device. In a case where there is a plurality of types of the recording tape cartridge 10 to be handled and a plurality of types of drive device, it is necessary to identify a generation, recording capacity or the like of the recording tape cartridge 10. The diagonal angle of the opening face of the opening 20 may be utilized for this identification.

Accordingly, the opening 20 for drawing out of the magnetic tape T, which has been implemented in consideration of strength as described above, can also function as an identification portion in a library apparatus, based on the diagonal angle of the opening face of the opening 20 (to be specific, the diagonal angle of the ceiling plate and floor plate that define the top and bottom of the opening 20). Therefore, insufficient strength of the case 12, a deterioration of dustproofing and complicated mold construction, which are concerns in a situation in which the opening 20 and the identification portion are provided separately (for example, a case in which one or a plurality of through-holes formed in the case 12 serve as an identification portion), can be prevented.

[Door Structure]

Figure 4:
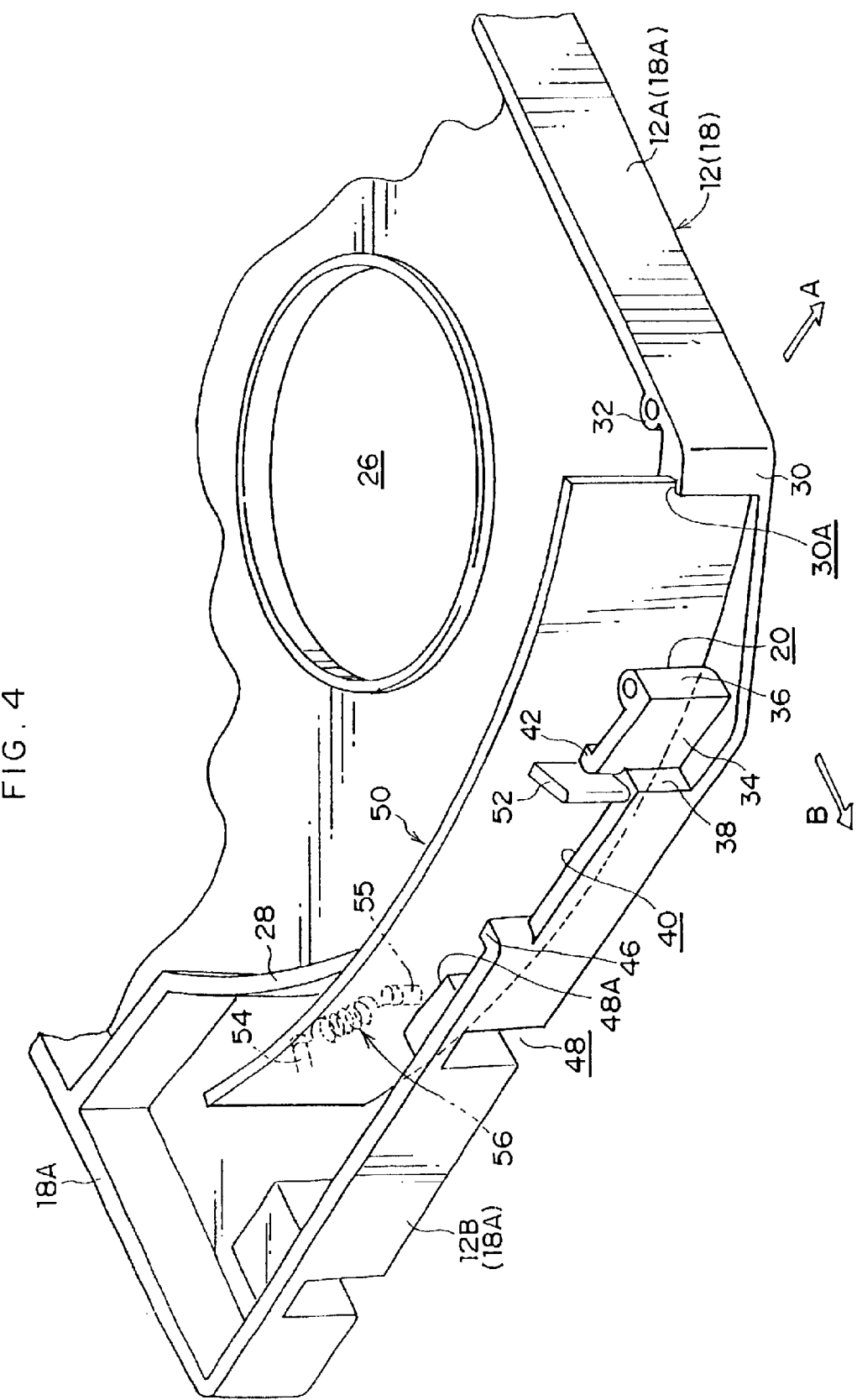
FIG. 4 is a schematic perspective view, viewed from above, showing a door in a closed state of an opening.
Figure 5:
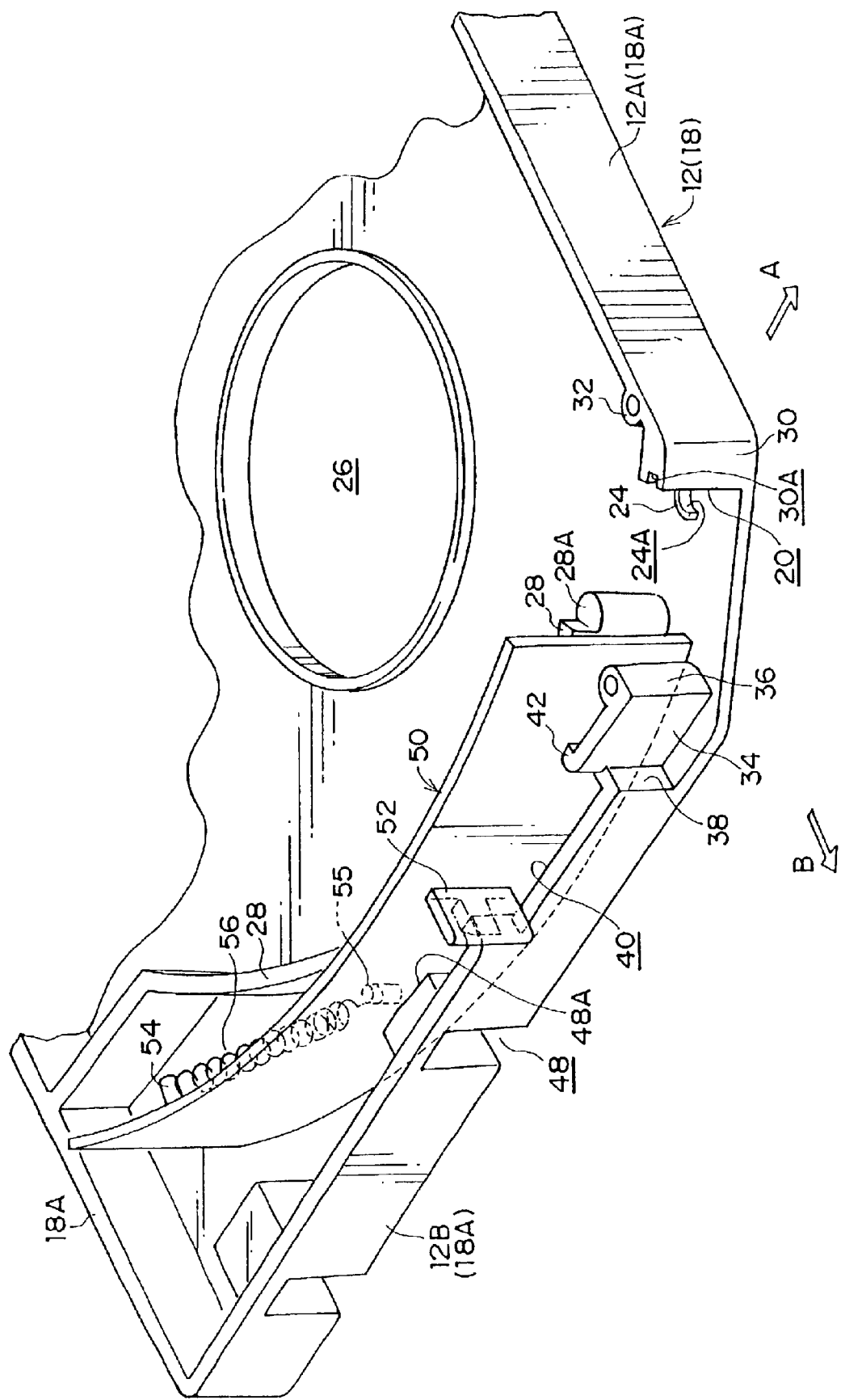
FIG. 5 is a schematic perspective view, viewed from above, showing the door in an open state of the opening.

As shown in FIGS. 4 and 5, which are viewed with the reel 14, the upper case 16 and the like removed, the opening 20 is opened and closed by the door 50, which serves as a covering member. The door 50 is formed in a circular arc form in plan view, which is curved in a plate thickness direction along a predetermined circular circumference, with a plate width (height) of the door 50 set to be substantially the same as an opening height of the opening 20, and a plate length thereof being significantly greater than an opening width of the opening 20.

Figure 6A:
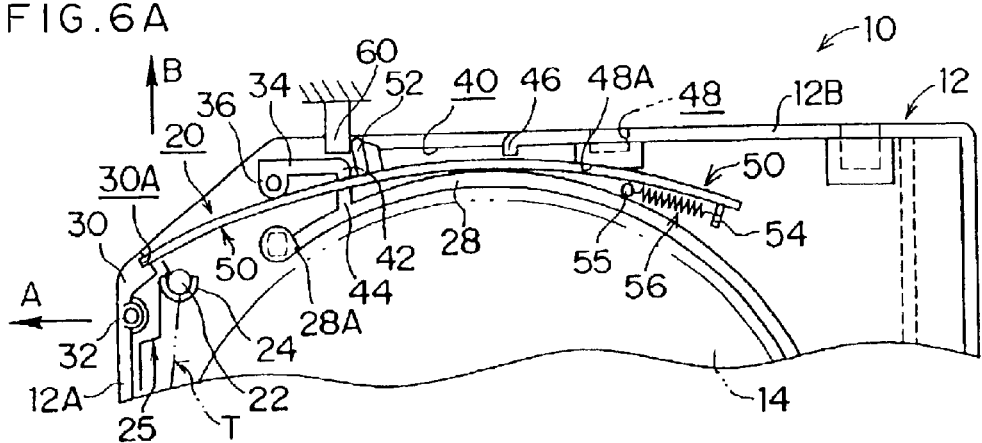
FIG. 6A is a schematic plan view showing a state during a transition of the door from the closed state of the opening to the open state.

Specifically, in this structure, in a state in which the door 50 has entered into the recess portion 30A of the diagonal wall portions 30 (a closed position), the door 50 closes the opening 20 (see FIG. 6A). The door 50 opens the opening 20 by moving (rotating) substantially rearward along the aforementioned circular circumference, (see FIG. 6B). When an outer peripheral surface of a distal end vicinity of the door 50 reaches a vicinity of the screw bosses 36, the opening 20 is completely opened (an open position; see FIG. 6C). When the opening 20 is open, the door 50 closes the opening 20 by rotating substantially in the opposite direction. In the closed state of the opening 20, the door 50 abuts against at least one of the screw bosses 36, the protrusion portion 42 and the protrusion portion 44.

That is, the door 50 is formed to be curved in an arc shape corresponding to the predetermined circular circumference, which is a movement path of the door 50. In the present embodiment, a position of a center of rotation of the door 50 in a left-right direction is specified to be at a left end vicinity of the case 12, and a position thereof in a front-rear direction is specified to be at a vicinity of the rear end of the slit 40. Consequently, the movement path of the door 50 is closest to the right wall 12B of the case 12 in the vicinity of the rear end of the slit 40. The rotation center and a turning radius of the door 50 may be suitably determined in accordance with the positions of the front and rear edge portions of the opening 20 (the diagonal wall portions 30 and the screw bosses 36). These positions are determined by requirements of the drive device, in accordance with the angle of the facing surface of the opening 20, which is determined by requirements of a library apparatus, and the like.

A rear end portion of a length dimension along the curve of the door 50 is determined so as to be located at a rear-right corner portion, which is rearward of the recess portion 48 of the case 12, in the state in which the opening 20 is closed. Accordingly, all through the process of opening and closing the opening 20, the door 50 is guided (looseness thereof is restrained) by the screw bosses 36, the protrusion portions 42, 44 and 46, and the guide surface 48A (and the free play-restricting walls 28) of the case 12.

At an outer peripheral surface of the door 50, slightly forward from a length direction central portion thereof, the operation projection 52 projects along a diametric direction of the door 50, to serve as an operation portion. The operation projection 52 is exposed to the outside of the case 12 through the slit 40. When the opening 20 is in the closed state, the operation projection 52 is positioned to be slightly separated from the protrusion portion 42 at the rear end of the offset wall portions 34, and is operable through the portion of the slit 40 that opens frontward at the step portions 38.

When the opening 20 is in the opened state, the operation projection 52 is positioned to be slightly separated from the protrusion portion 46 at the rear edge of the slit 40. The dimensions of each portion are determined such that a length direction of the operation projection 52 is substantially perpendicular to the right wall 12B of the case 12 (the direction of arrow A) in this state.

Thus, although this operation projection 52 communicates between the interior and exterior of the case 12 via the slit for exposure, the slit 40 is always substantially closed by the door 50, which spans substantially the whole height of the interior of the case 12, and by the protrusion portion 42 and protrusion portion 46 which guide the door 50. In addition, a labyrinthine structure is formed between the slit 40 and the accommodation space for the reel 14 by the free play-restricting walls 28 which serve as inner walls and the protrusion portion 44 which guides the door 50. Accordingly, adherence of dust and the like to the magnetic tape T wound onto the reel 14 is prevented.

A spring-holding portion 54 protrudes along the diametric direction of the door 50 from an interior peripheral portion at a rear end vicinity of the door 50. One end portion of a coil spring 56, which serves as urging means (an urging element), is engaged with a spring-engaging portion 55, which is provided inside the case 12 at a vicinity of the recess portion 48. Another end portion of the coil spring 56 is engaged and held at the spring-holding portion 54. Accordingly, in this structure, the door 50 is urged in a direction to close the opening 20 by urging force of the coil spring 56, and the door 50 continuously closes the opening 20. The coil spring 56 has a length that reaches as far as the rear-right corner portion of the case 12 in the state in which the door 50 opens the opening 20 as described above. Thus, the coil spring 56 is disposed so as to effectively use a space between the free play-restricting walls 28 and the peripheral walls 16A and 18A at the rear-right corner portion.

The door 50 described hereabove is formed of, for example, a polyoxymethylene (POM) resin, which has a low coefficient of friction and has excellent abrasion resistance with respect to the case 12 constituted of PC. The operation projection 52, the spring-holding portion 54 and the like may be structured as separate bodies (of different materials). Thus, because operation of the door 50 can be carried out smoothly, it is preferable if clearances between end surfaces at the top and bottom of the door 50 and the ceiling plate and floor plate of the 12 are set to the order of 0.05 mm to 0.2 mm each.

Next, operation of the recording tape cartridge 10 having the structure described above will be described. The opening 20 of the recording tape cartridge 10 is closed by the door 50 when the recording tape cartridge 10 is not in use (during storage, during transportation, and the like). Specifically, a distal end portion (front end portion) of the door 50 is entered into the recess portion 30A of the diagonal wall portions 30 by the urging force of the coil spring 56. At the same time, an intermediate portion outer peripheral surface of the door 50 abuts against the outer peripheral surface of the screw bosses 36 to close the opening 20.

In contrast, when the magnetic tape T is to be used, the recording tape cartridge 10 is loaded into the bucket 60 of the drive device along the direction of arrow A. In accordance with this loading, as shown in FIG. 6A, the engaging protrusion 60, which serves as the opening member structuring opening means of the drive device, advances into the slit 40 which opens frontward at the step portions 38, and engages with the operation projection 52 of the door 50.

Figure 6B:
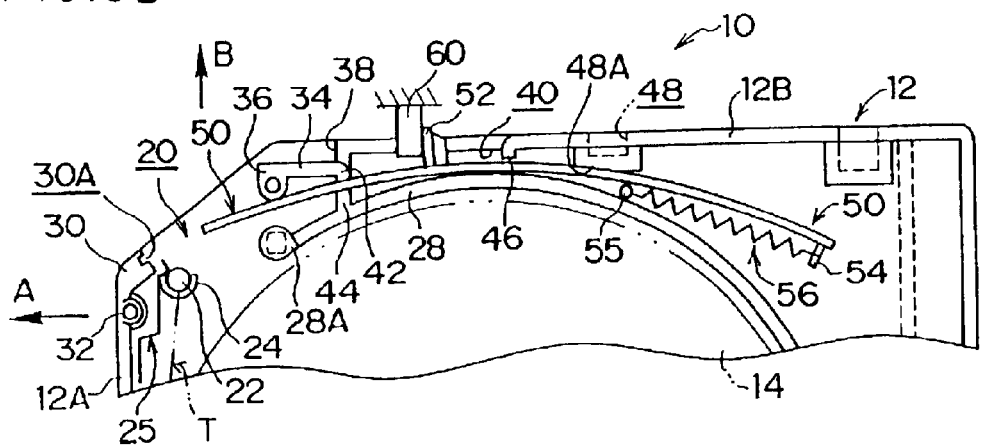
FIG. 6B is a schematic plan view showing another state during a transition of the door from the closed state of the opening to the open state.

As the recording tape cartridge 10 (the case 12) is pushed in further, the urging force of the coil spring 56 is opposed by a force of pushing in and, as shown in FIG. 6B, the engaging protrusion 60 moves the operation projection 52 rearward (that is, relatively rearward with respect to the case 12 which is being loaded in the direction of arrow A). Thus, the door 50 from which the operation projection 52 protrudes is guided by the screw bosses 36, the protrusion portions 42, 44 and 46, and the guide surface 48A. At the same time, the door 50 rotates clockwise, in plan view, along the direction of curvature thereof.

Figure 6C:
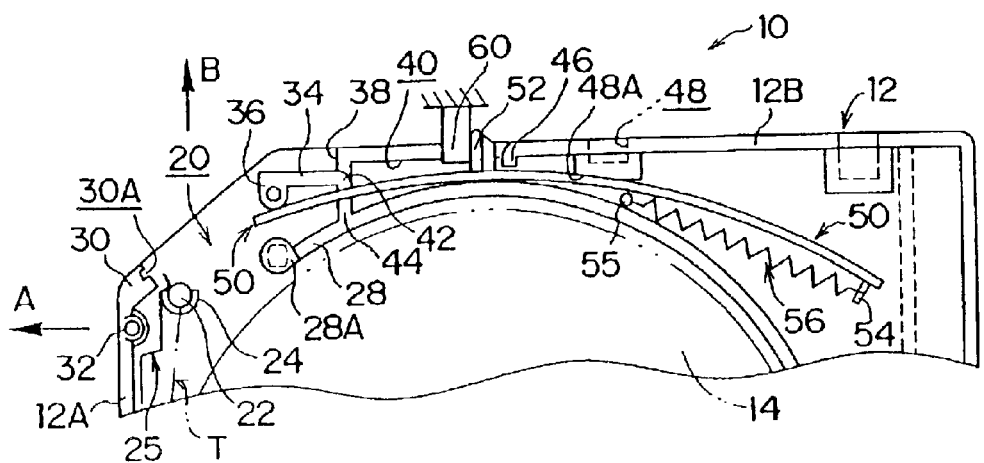
FIG. 6C is a schematic plan view showing yet another state during a transition of the door from the closed state of the opening to the open state.

That is, the door 50 moves substantially rearward so as to swing at the outer side of the reel 14 and the pin stands 24 without significantly deviating from the movement path along the shape of the curvature, and the door 50 opens the opening 20. Thus, when the case 12 (the recording tape cartridge 10) is loaded to a predetermined depth in the drive device, the opening 20 is completely opened, as shown in FIG. 6C. In this state, the recording tape cartridge 10 is positioned in the drive device, and further rotation of the door 50 (substantially rearward movement thereof) is restricted.

In this state, the recording tape cartridge 10 is positioned within the drive device. Then, the drawing-out means of the drive device advances into the case 12 through the opened opening 20, and the drawing-out means takes out the leader pin 22, which has been positioned and accommodated at the pin stands 24, and accommodates the leader pin 22 at the winding reel. Then, the winding reel and the reel 14 are driven to rotate at the same time, and the magnetic tape T is wound around the winding reel while being sequentially drawn out from the case 12. Information recording/replaying is carried out on the magnetic tape T by the recording/replaying head or the like which is disposed along the predetermined tape path.

Subsequently, when the magnetic tape T has been wound back to the reel 14 again, the recording tape cartridge 10 is ejected from the drive device. At this time, the state of positioning of the recording tape cartridge 10 is released, and the recording tape cartridge 10 is moved in a direction opposite to the direction of arrow A by the urging force of the coil spring 56 and/or by an unillustrated ejection mechanism. Thus, the door 50 is guided by the screw bosses 36, the protrusion portions 42, 44 and 46, and the guide surface 48A, while being rotated in the closing direction of the opening 20 by the urging force of the coil spring 56. The distal end portion of the door 50 enters into the recess portion 30A of the diagonal wall portions 30, and the door 50 returns to the initial state in which the opening 20 is completely closed.

Here, because the opening 20 is formed by cutting away the loading side corner portion of the rectangular case 12, the opening face of the opening 20 faces in the direction of arrow A and in the direction of arrow B (the facing angle is diagonal with respect to the direction of arrow A). This means that the drawing-out means of the drive device can gain access to the leader pin 22 from a front face side which faces the case 12 in the direction of arrow A, and it is not required that the drawing-out means gain access from a side that is outside of the arrow B side peripheral walls (side walls) 16A and 18A (i.e., from an arrow B side). Consequently, in this drive device, a path for drawing out the magnetic tape T can be made as short as possible, and the drawing-out means does not require a drive mechanism for turning the magnetic tape T around from the arrow B side of the case 12. Thus, a reduction in size and cost reductions can be expected.

Further, the door 50, which is curvedly formed in the circular arc shape, is rotated to open and close the opening 20 by swinging around an outer side of the reel 14 and the pin stands 24 (and the leader pin 22) without deviating from the movement path along the shape of the curvature. Therefore, the door 50 will not protrude beyond an external profile region of the case 12 during opening and closing of the opening 20. Consequently, a space for accommodation of the recording tape cartridge 10 in the drive device is small, and the movement path of the door 50 does not interfere with the pin stands 24 (the leader pin 22), the reel 14 and the like in the case 12.

Further yet, it is sufficient that the engaging protrusion 60 of the drive device be fixedly disposed to be engageable with the operation projection 52 of the door 50 simply by advancing into the slit 40 from the front side thereof. Thus, construction is simple. Further again, because the door 50 closes the opening 20 due to the urging force of the coil spring 56, a drive device side mechanism for driving the door 50 in the direction of closing the opening 20 is not required. Thus, construction of the opening means (opening member) of the drive device is made more simple.

Accordingly, with the recording tape cartridge 10 according to the present embodiment, the door 50, which can make a space for accommodating the recording tape cartridge 10 at the drive device smaller, can open and close the opening 20, whose structure can minimize length of the drawing-out path of the magnetic tape T, without the door 50 interfering with the reel 14 and the leader pin 22. Moreover, the engaging protrusion 60, which serves as the opening means (opening member) for operating the door 50 to open and close the opening 20, can be given a simple structure.

Because the movement path of the door 50 as described above is a circular circumference (a curvilinear shape), the corner portion of the case 12 can be greatly cut away, and the opening 20 can be formed to be large. That is, in a case in which, for example, a flat plate-form covering member is inclined relative to the direction of arrow A, this covering member will be accommodated in an exterior profile region of the case 12. In this situation, an operation area that is required for changing the attitude of the covering member by linear displacement or rotary displacement to open and close the opening 20 will be greater, and the opening 20 will have to be made smaller (the cutaway portion of the corner portion of the case 12 that forms the opening 20 will have to be made smaller) such that the operation of the covering member does not interfere with the leader pin 22, the reel 14 and the like. However, with the recording tape cartridge 10 relating to the present embodiment, because the door 50 which opens and closes the opening 20 by turning on the predetermined circular arc without deviating therefrom as described above is provided, an increase in size of the opening 20 can be enabled.

In particular, a center of rotation of the door 50 for opening and closing the opening 20, whose opening face is diagonal with respect to the direction of arrow A, can be determined independently of the position of an axial center of the reel 14. Therefore, the angle of inclination of the opening face of the opening 20 relative to the direction of arrow A, the size of the opening 20 (a separation between front and rear edge portions thereof), and the like can be freely specified. Thus, the door 50 can be provided for opening and closing the opening 20, with the opening 20 having dimensions and shape freely selected in accordance with requirements of the drive device and the like. That is, with the structure in which the door 50 is provided, a degree of freedom of design of the opening 20 (and thus the recording tape cartridge 10) is improved.

Further, when the length of the path for drawing out the magnetic tape T is minimized as described above, a running path of the magnetic tape T will inevitably be shortened too. As a result, contact friction of the magnetic tape T with tape guides (for example, rotatably supported rollers and the like) can be reduced. Furthermore, the opening 20 is formed by cutting away the corner portion of the case 12, and faces in the direction of arrow A and in the direction of arrow B. Thus, a range of directions of access to the leader pin 22 by the drawing-out means (by hooks thereof or the like) is widened. Therefore, positions at which the leader pin 22 can be disposed in the case 12 are broadened. Therefore, given that the operation path of the door 50 as described above must not interfere with positions at which the leader pin 22 can be disposed in practice, a degree of freedom of design of the drive device is improved.

Further again, because the door 50 is a separate member from the leader pin 22 that is drawn out from the case 12, in this structure the door 50 cannot be taken out from the case 12 in an assembled state. Thus, the door 50 will not be removed from the case 12 by an impact when the recording tape cartridge 10 is dropped or the like. Moreover, the leader pin 22 is accommodated in the case 12 in a firmly shut state when the opening 20 has been closed by the door 50 at a time of non-use. Thus, the leader pin 22 is less likely to become damaged or soiled. Consequently, drawing out and running the magnetic tape T at the drive device will not affect the drive device, and the magnetic tape T itself will not suffer from damage.

Figure 7:
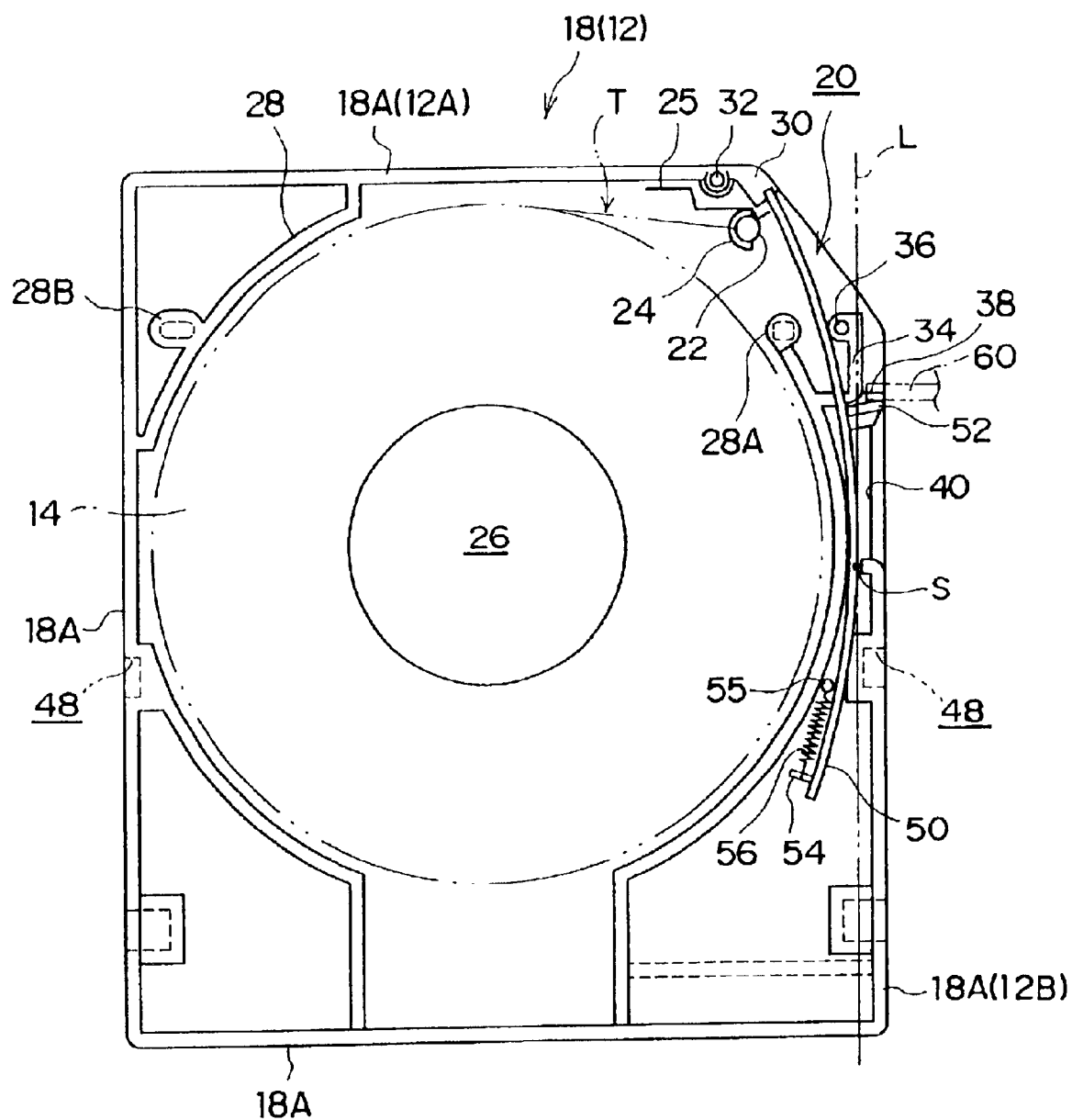
FIG. 7 is a schematic plan view of the lower case showing the door in the closed state of the opening.
Figure 8:
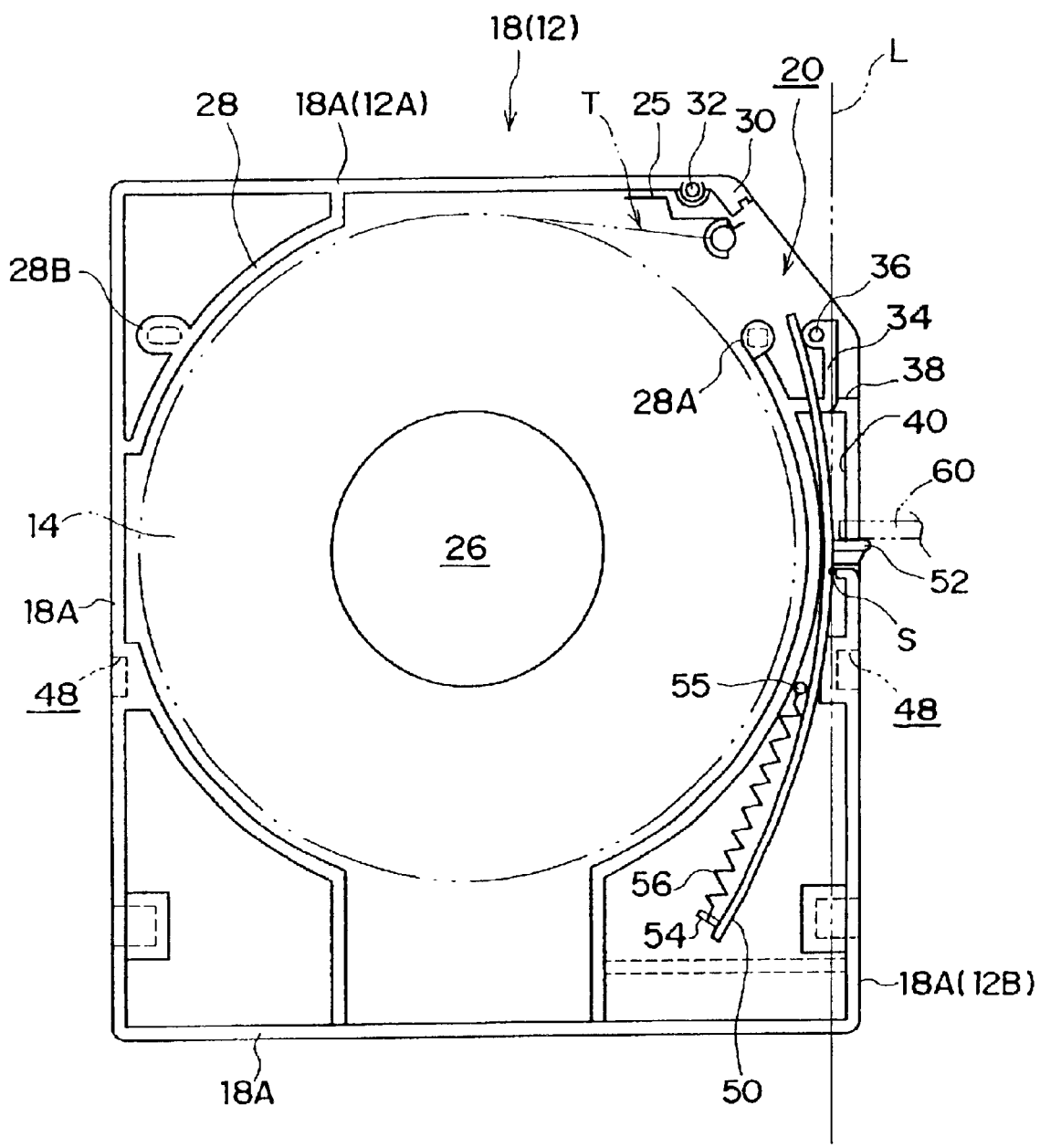
FIG. 8 is a schematic plan view of the lower case showing the door in the open state of the opening.
Figure 9:
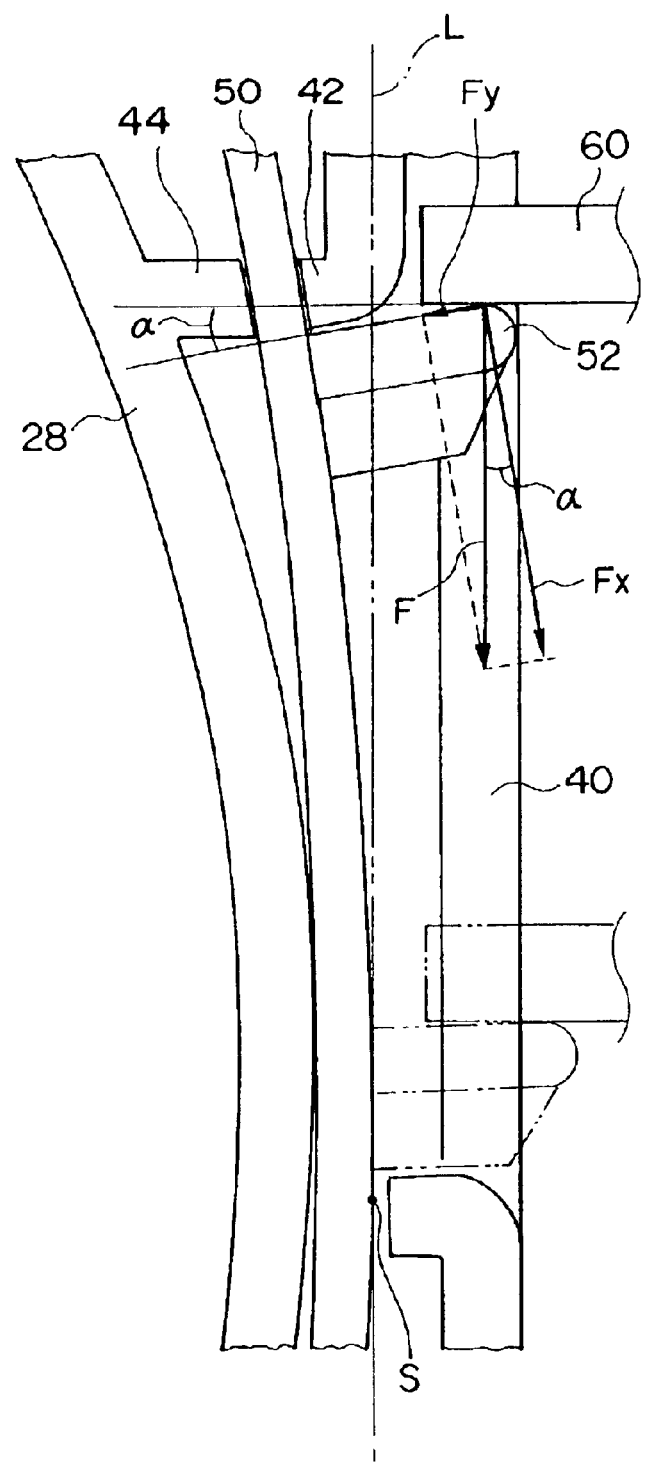
FIG. 9 is an explanatory diagram showing a process of movement of an operation projection of the door.
Figure 10:
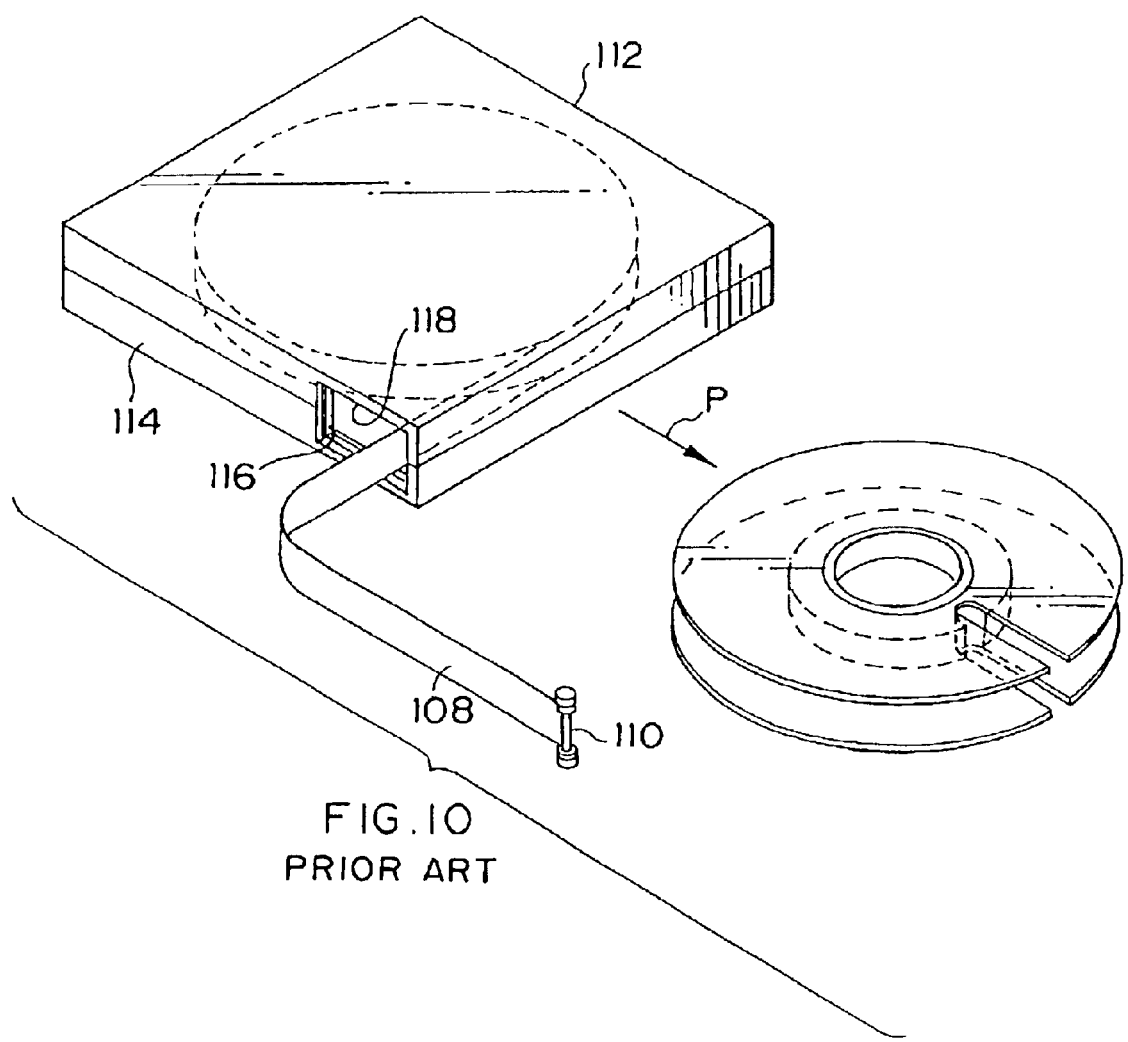
FIG. 10 is a schematic perspective view of a conventional recording tape cartridge equipped with a leader pin.
Figure 11:
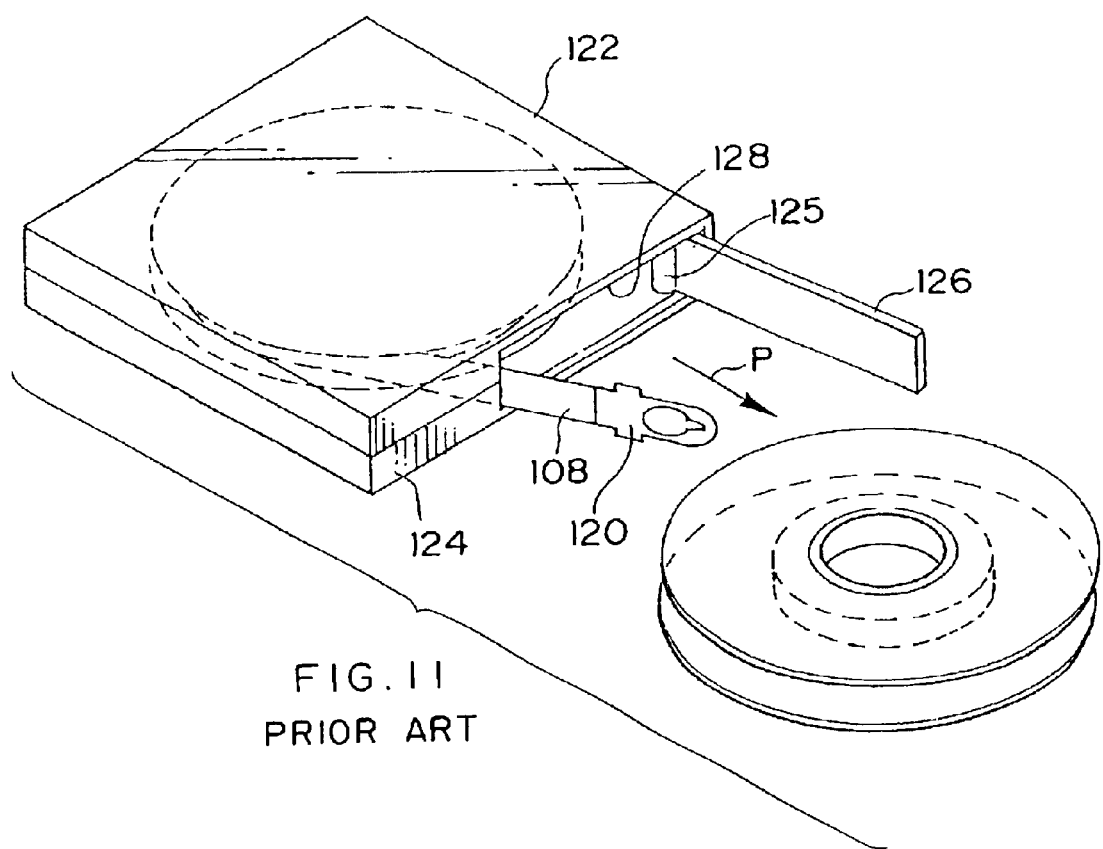
FIG. 11 is a schematic perspective view of a conventional recording tape cartridge equipped with a leader tape.
Figure 12:
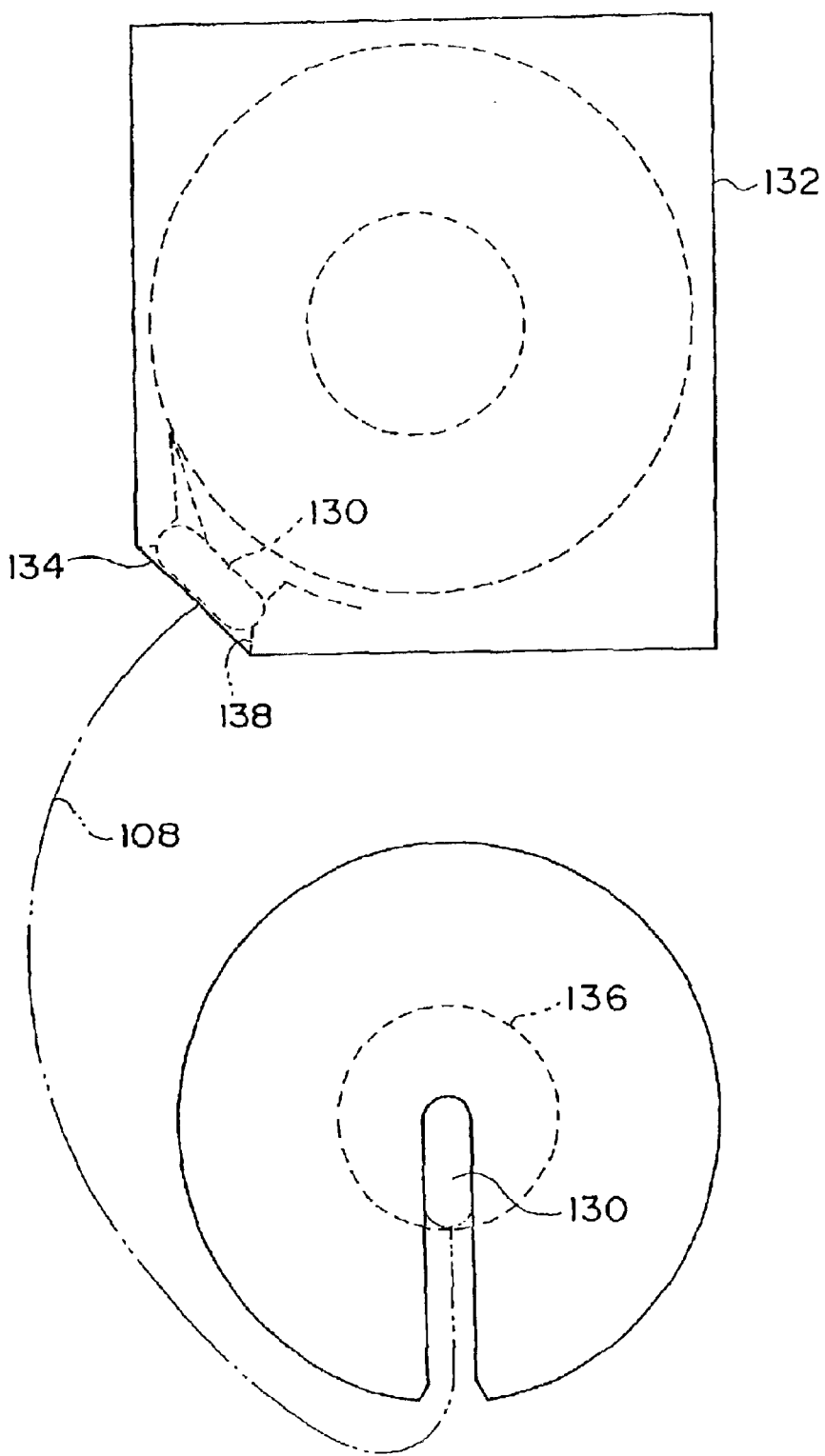
FIG. 12 is a schematic plan view of a conventional recording tape cartridge equipped with a leader block.

Next, opening and closing operations of the door 50 of the recording tape cartridge described above will be described in further detail. The operation projection 52 of the door 50 is exposed through the slit 40 as shown in FIGS. 7 and 8. The engaging protrusion 60, which is provided at the drive device as an opening member, moves the door 50 a certain distance substantially in the front-rear direction. At this time, the engaging protrusion 60 pushes the operation projection 52 relatively in a rearward direction parallel to the direction of loading into the drive device. However, because the door 50 is formed in the substantially circular arc form in plan view, a resultant pushing force F can be analyzed into two directions as shown in FIG. 9.

That is, if a contact angle of the engaging protrusion 60 with the operation projection 52 is $\alpha$, the pushing force is analysed into a force $F \cos \alpha$ (below referred to as Fx), which acts in a tangential direction of the door 50, and a force $F \sin \alpha$ (below referred to as Fy), which acts in a direction normal to the door 50. Of these, the force Fx acting in the tangential direction of the door 50 is a force that acts to move the door 50 in the opening direction. However, the force Fy acting in the normal direction of the door 50 (which at a front side is a direction into the case) is a resisting force which hinders movement of the door 50 in the opening direction.

The direction of operation of this resisting force Fy reverses between a front side and a rear side of a boundary point at a position S, at which the movement path of the door 50 is closest to the right wall 12B (excluding the offset wall portions 34, the protrusion portions 42 and 46, and the guide surface 48A) in plan view. That is, when the door 50 is moved in the opening direction and the operation projection 52 passes this position S, the resisting force Fy acting on the operation projection 52 changes from a direction into the case to a direction out of the case at the position S. Consequently, movement of the door 50 in the opening direction is inconsistent, resistance to movement during the opening operation is large, and the door 50 is difficult to open.

Accordingly, in the present embodiment, the operation projection 52 is moved at either one of a front side including the position S and a rear side including the position S (at which the movement path of the door 50 is closest to the right wall 12B (excluding the offset wall portions 34, the protrusion portions 42 and 46, and the guide surface 48A) in plan view), such that the resisting force Fy that acts in the normal direction of the door 50 works in one of the direction into the case and the direction out of the case. The position S is a position at which the engaging protrusion 60 and the operation projection 52 abut (engage) in a parallel state ($\alpha=0$), and the resisting force Fy is at a zero point. Thus, the position S is a position at which the pushing force F from the engaging protrusion 60 is only the operating force Fx that acts in the tangential direction of the door 50 (F=Fx).

Consequently, by moving the operation projection 52 at the front side or rear side including (or, if desired, not including) the position S, the movement of the door 50 in the opening direction can be made consistent, and the door 50 can be made to move comparatively smoothly. The position that is closest to the right wall 12B may also be defined as the position of a point of contact between the movement path of the door 50 and a tangent L of the movement path in a case in which the tangent L is drawn parallel to the direction of loading into the drive device. Further, the operation projection 52 may be provided at an outer peripheral portion of the door 50 with, for example, an unillustrated resilient member such as a leaf spring or the like interposed therebetween, such that the attitude of the operation projection 52 is deformable to follow the engaging protrusion 60, so as to constantly contact the engaging protrusion 60 in a state of being parallel to the engaging protrusion 60 ($\alpha=0$).

According to the present invention described above, an opening aperture is formed by cutting away a corner portion at a side of loading a case into a drive device. Therefore, an opening face of the opening aperture can be faced toward the drive device, and drawing-out means at the drive device side can be advanced into the opening aperture from a forward side thereof. Thus, a drawing-out path of a recording tape can be made as short as possible. Accordingly, a complicated mechanism for turning and guiding the recording tape at the drive device is not required, and the drive device can be designed to be compact, with low production costs.

Further, a covering member is formed in a substantially circular arc shape in plan view to move on a predetermined circular circumference. Thus, the opening aperture can be made larger, construction is simple, and a space-saving structure can be obtained. Therefore, efficient use of space in the case and in the drive device is provided for. Consequently, a cartridge area in the drive device can be made small, and a reduction in size of the drive device can be expected.

Furthermore, a range through which an operation member of the covering member moves is at one side of a position at which the movement path of the covering member is closest to a side wall, which is parallel to the direction of loading into the drive device, in plan view, and is bounded by that position. Therefore, a resisting force that a drive device side opening member applies to the operation portion acts in only one of a direction into the case and a direction out of the case. Consequently, compared to a situation in which the resisting force works in both directions, movement of the covering member in an opening direction can be made more consistent, and the covering member can be moved relatively smoothly.

What is claimed is:

1. A tape cartridge which is insertable at a tape drive, the tape drive being provided with an opening member which is operably engageable with the tape cartridge at a time of insertion of the tape cartridge and carrying out at least one of reading and writing of data, the tape cartridge comprising:

a case which includes
      a front wall portion facing in a direction of insertion of the cartridge,
      a side wall portion substantially parallel to the cartridge insertion direction, and
      an angled wall portion connecting the front wall portion and the side wall portion, and angled relative to the cartridge insertion direction;

a tape access opening provided at the angled wall portion of the case;

a covering member which is reciprocally moveable along a circular arc-form movement path between a closed position for closing the tape access opening and an open position for opening the tape access opening; and an operation portion provided at the covering member, the operation portion being capable of moving the covering member in an open position direction when engaged with the opening member of the tape drive by an operation of insertion of the tape cartridge, wherein a position in the cartridge insertion direction of a point at which the circular arc-form movement path is closest to the side wall portion of the case is outside a range, in the cartridge insertion direction, of movement of a point of engagement of the opening member of the tape drive with the operation portion.

2. The tape cartridge of claim 1, wherein the position closest to the side wall portion is at a rear side of the range of movement in the cartridge insertion direction.

3. The tape cartridge of claim 1, further comprising a window portion provided at the side wall portion of the case, which window portion allows relative engagement of the opening member of the tape drive with the operation member at the time of insertion of the tape cartridge.

4. The tape cartridge of claim 3, wherein the window portion comprises structure such that the window portion does not physically interfere with the opening member of the tape drive and the operation member at the time of insertion of the tape cartridge, and the window portion comprises a long, narrow slit extending along the cartridge insertion direction.

5. The tape cartridge of claim 3, further comprising a wall portion for reinforcement between the window portion and the tape access opening, which makes the window portion and the tape access opening non-continuous with one another.

6. The tape cartridge of claim 1, further comprising a reel at which a tape is wound, the reel being accommodated in the case such that the tape can be drawn out through the tape access opening.

7. The tape cartridge of claim 6, further comprising a partition wall portion disposed between the reel and the circular arc-form movement path.

8. The tape cartridge of claim 7, wherein the partition wall portion comprises a part-cylindrical form which is substantially concentric with the reel.

9. The tape cartridge of claim 1, wherein the case appears substantially rectangular in plan view.

10. The tape cartridge of claim 1, wherein the case is formed of a resin, and the covering member is formed of an abrasion-resistant resin which is different from the resin of the case.

11. The tape cartridge of claim 1, further comprising an urging element which continuously urges the covering member in a closed position direction.

12. The tape cartridge of claim 11, wherein the case comprises: an upper case and a lower case which structure the case; and a plurality of joining portions for joining the upper case and the lower case.

13. The tape cartridge of claim 12, further comprising a leader member attached to a tape end.

14. The tape cartridge of claim 13, wherein the leader member is detachably held at a position on or at an inner side of a line from one to another of joining portions that are located at vicinities of end portions, in plan view, of the tape access opening.

15. The tape cartridge of claim 14, wherein the leader member comprises a leader pin, and the tape cartridge further comprises a holding structure which detachably holds the leader pin at each side in a longitudinal direction of the leader pin.

16. A tape drive for carrying out at least one of reading and writing of data at a tape cartridge that includes:

a case which includes a front wall portion facing in a direction of insertion of the cartridge, a side wall portion substantially parallel to the cartridge insertion direction, and an angled wall portion connecting the front wall portion and the side wall portion and angled relative to the cartridge insertion direction;

a tape access opening provided at the angled wall portion of the case;

a covering member which is reciprocally moveable along a circular arc-form movement path between a closed position for closing the tape access opening and an open position for opening the tape access opening; and an operation portion provided at the covering member, the operation portion being capable of moving the covering member in an open position direction when engaged with the tape drive by an operation of insertion of the tape cartridge, a position in the cartridge insertion direction of a point at which the circular arc-form movement path is closest to the side wall portion of the case being outside a range, in the cartridge insertion direction, of movement of a point of engagement of the opening member of the tape drive with the operation portion, wherein the tape drive comprises an opening member which is capable of engaging with the operating portion of the covering member and moving the covering member in the open position direction at the time of insertion of the tape cartridge.

17. The tape drive of claim 16, wherein the opening member projects in a direction intersecting the tape cartridge insertion direction.

18. The tape drive of claim 16, wherein the opening member is stationary in the tape drive.

19. The tape drive of claim 16, wherein the opening member advances into the tape cartridge at the time of insertion of the tape cartridge.

20. The tape drive of claim 19, wherein a window portion is provided at the tape cartridge, and the opening member advances through the window portion.

* * * * *